United States Patent [19]

Kobayashi et al.

[11] 3,727,200

[45] Apr. 10, 1973

[54] LAMINATED FERRITE SHEET MEMORY

[76] Inventors: Seihin Kobayashi, No. 2523 Washizu, Kosai-cho; Michihiro Torii, No. 389 Washizu, Kosai-cho; Tomohiro Itoh, No. 940 Furumi, Kosai-cho, all of Shizuoka-ken, Japan

[22] Filed: Oct. 20, 1970

[21] Appl. No.: 82,391

[30] Foreign Application Priority Data

Oct. 27, 1969 Japan ................................44/86207

[52] U.S. Cl. ............... 340/174 WB, 340/174 JA, CC, 340/174 CC, 340/174 M, 340/174 MA, 29/604

[51] Int. Cl. ................................................G11c 5/02

[58] Field of Search ..................340/174 M, 174 MA, 340/174 WB, 174 CC, 174 JA; 29/604

[56] References Cited

UNITED STATES PATENTS

| | | | |
|---|---|---|---|
| 3,123,748 | 3/1964 | Brownlow | 340/174 JA |
| 3,471,836 | 10/1969 | Smith et al. | 340/174 M |
| 3,139,608 | 6/1964 | Doughty | 340/174 M |

*Primary Examiner*—James W. Moffitt
*Attorney*—Wenderoth, Lind & Ponack

[57] ABSTRACT

In a laminated ferrite sheet memory within which upper conductive windings and lower conductive windings are embedded to intersect with each other, each of said conductive windings has different circumferential length at the intersections and at other places except the intersections. The circumferential length at the intersections is shorter than that at the other places.

7 Claims, 10 Drawing Figures

SEIHIN KOBAYASHI,
MICHIHIRO TORII &
TOMOHIRO ITOH

INVENTORS

BY Wenderoth, Lind & Ponack

ATTORNEYS

SEIHIN KOBAYASHI,
MICHIHIRO TORII &
TOMOHIRO ITOH,

INVENTORS

BY Wenderoth Lind & Ponack

ATTORNEYS

LAMINATED FERRITE SHEET MEMORY

This invention relates to a laminated ferrite sheet memory within which upper conductive windings and lower conductive windings are embedded to intersect with each other to provide a number of addresses.

Some kinds of laminated ferrite sheet memories of the type described are known. In one type of such memories, the conductive windings are made of conductive metal particles embedded in a ferrite sheet and combined to form the drive windings. In the other type thereof, the conductive windings are made of conductive metal wires. Such memories have industrial advantages that multiple bits can be provided simultaneously.

But, compared with a magnetic core matrix in which a number of toroidal cores arranged in a matrix are strung by a plurality of windings, such laminated ferrite sheet memories have a disadvantage that a large back voltage occures to a drive device. Therefore, it has been very difficult to provide memories of high speed and large capacity.

An object of the present invention is, therefore, to reduce the back voltage to make it possible to provide a laminated ferrite sheet memory of high speed and large capacity.

According to a laminated ferrite sheet memory of the present invention within which upper conductive windings and lower conductive windings are embedded to intersect with each other, each of said drive windings has a different circumferential length at the intersections and at other places except the intersections, said circumferential length at said intersections being shorter than that at said other places.

Figures 1A, 1B, 2:
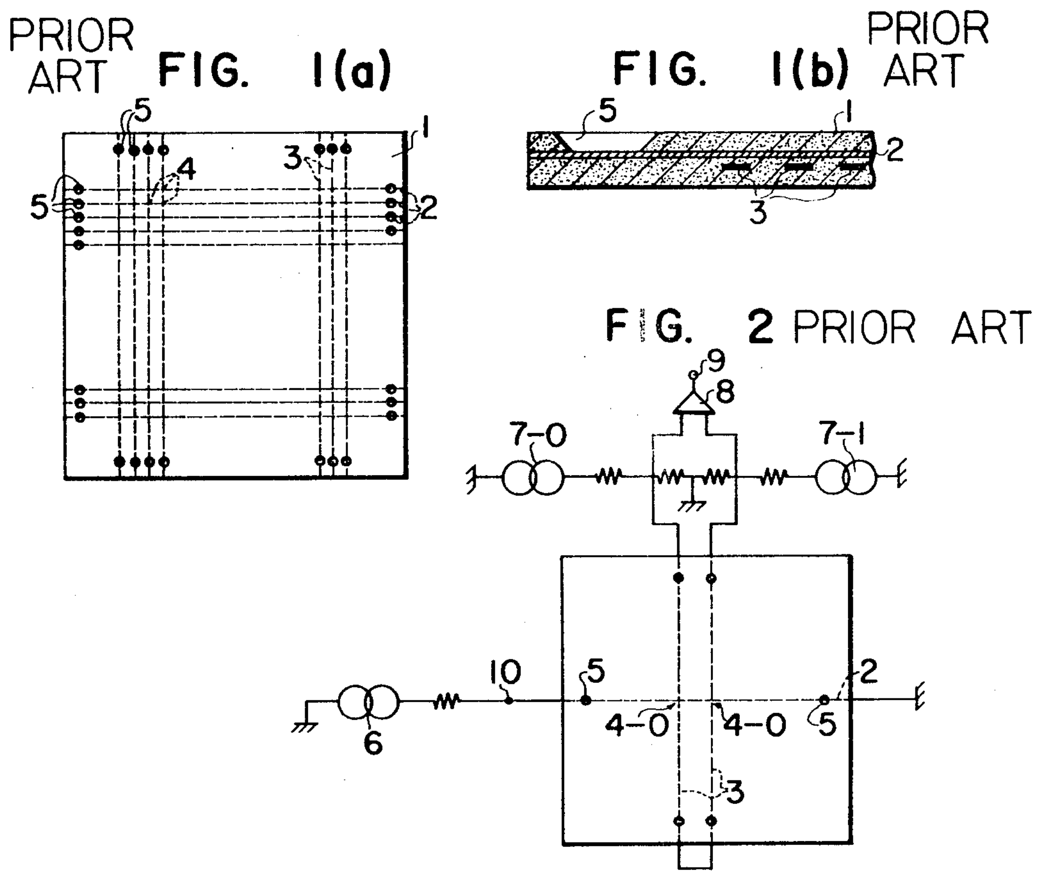
FIG. 1(a) PRIOR ART, FIG. 1(b) PRIOR ART, FIG. 2 PRIOR ART
Figures 3A, 3B, 3C, 3D:
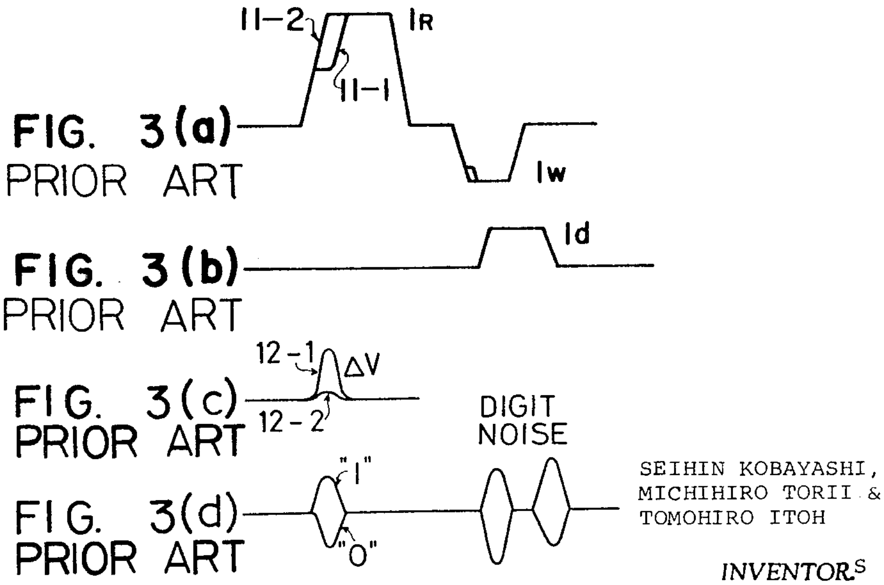
FIG. 3(a) PRIOR ART, FIG. 3(b) PRIOR ART, FIG. 3(c) PRIOR ART, FIG. 3(d) PRIOR ART
Figure 4:
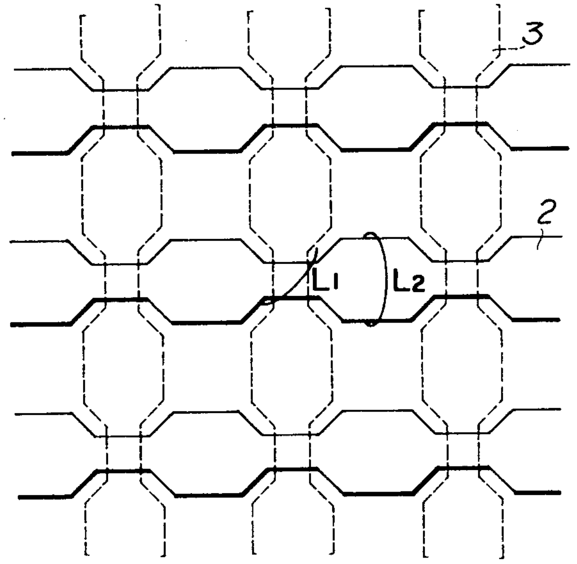
Figure 5A:
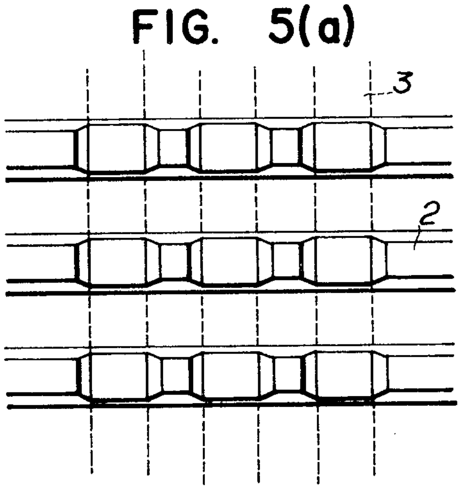
Figure 5B:
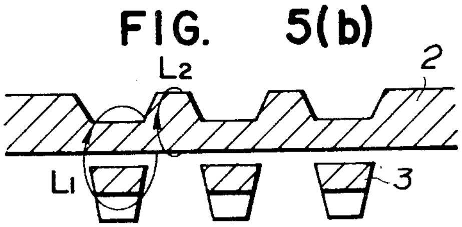

For a better understanding of the invention and to show how it may be carried into effect, an embodiment of the prior art and the present invention will now be described, by way of example, with reference to the accompanying drawings, in which:

FIGS. 1(*a*) and 1(*b*) show a conventional laminated ferrite sheet memory, wherein FIG. 1(*a*) is a plan view and FIG. 1(*b*) is a partially enlarged sectional view, FIG. 2 shows a drive circuit for the laminated ferrite sheet memory in FIG. 1, FIGS. 3*a*–3*d* show wave forms of currents, wherein FIG. 3(*a*) shows read and write currents, FIG. 3(*b*) shows a digit current, FIG. 3(*c*) shows a back voltage generated in a word winding when the read current is applied thereto and FIG. 3(*d*) shows an output voltage appearing at an output terminal of a sense amplifier, FIG. 4 is a plan view showing a shape of conductive windings according to an embodiment of the present invention, and FIGS. 5(*a*) and 5(*b*) show another shape of conductive windings according to another embodiment of the present invention, wherein FIG. 5(*a*) is a plan view and FIG. 5(*b*) is a partially sectioned side view thereof.

Referring, in detail, to the conventional disadvantages with reference to the drawings shown in FIGS. 1 to 3, a plurality of parallel Y drive windings 2 and a plurality of parallel X drive windings 3 are embedded in a ferrite sheet 1 above and below to intersect substantially at right angles with each other at intersections 4. By "intersect" is meant that the X windings cross over or under the Y windings, yet are spaced above or below, as the case may be, the Y windings. The ferrite sheet 1 at both ends above the Y drive windings is eroded away to form concavities, through which external conductive wires are soldered to the Y drive windings.

For simplification, FIG. 2 shows a drive circuit in a two cross over points per bit mode and FIG. 3 shows wave forms of currents. When information is to be written in an address 4-0 or 4-1 where a word winding 2 and a digit winding 3 intersect, a write current $I_W$ and digit current I(*d*) are simultaneously applied to the word winding 2 through a word drive device 6 and to the digit winding 3 through a digit drive 7-0 or 7-1, respectively (when binary information "0" is written in, the drive device 7-0 is used, but when binary information "1" is written in, the drive device 7-1 is used). When the information is to be read out, a read current $I_R$ is applied to the word windings, whereby an output voltage "1" or "0" shown in FIG. 3(*d*) is obtained, in accordance with the kinds of informations written in, from an output terminal 9 of a sense amplifier 8 connected to output terminals of both digit windings.

As is apparent from FIG. 3(*a*), the wave form of the read current $I_R$ is deformed during the rising as shown by reference numeral 11-1, delaying the rising of the pulse. Such delay is caused by the back voltage generated from the memory. The back voltage, when measured at point 10, appears as ΔV shown in FIG. 3(*c*) by reference numeral 12-1.

The inventors have found that such back voltage is caused by magnetic switching at places except intersections of X and Y drive windings.

When the minimum length of flux path around intersections of X and Y conductive windings 2 and 3 in the conventional laminated ferrite sheet memory and the minimum length of flux path at places except the intersections thereof are defined as L1 and L2, respectively, the value of a ratio L2/L1, which is changed as the thickness of the windings and the spaces between the X and Y drive winding change, has been in the range of 0.58 to 0.68. This is because each of the X and Y drive windings has substantially a uniform shape in the conventional laminated ferrite sheet memory.

Whereas, a current I0 required to reverse the flux orientation in the magnetic circuit is defined as $$I0 = 2\pi r H0$$

wherein $\pi$ is the circular constant, $r$ is an effective radius of the flux and $H0$ is coercive force of the material. Namely, the current $I0$ is the in proportion to the flux path L which is substantially equal to $2\pi r$. Therefore, the current $I0$ required to reverse the flux orientation around the intersections of the X and Y drive windings is larger than that required to reverse the flux orientation at places not intersected by these windings. Accordingly, when the write current $I_W$ which is in-sufficient to reverse the flux orientation at the intersections of the X and Y drive windings is applied to the drive windings, the flux orientation at places except the intersections may be partially reversed. Such reversed flux is again reversed to the original state when the read current $I_R$, which has an opposite polarity to the write current $I_W$, is applied to the same windings, so that the back voltage ΔV is generated. The back voltage is accumulated along the entire length of the drive winding 2, thereby generating a greater back voltage.

According to the present invention, in order to make the value of the ratio L2/L1 larger than the conventional one, the circumferential length of each drive winding at the intersections is made shorter than that of the drive winding at places other than the intersections. As a result, the flux orientation at places not intersected by the drive windings is hardly reversed and the back voltage 12-1 is remarkably reduced, as shown by reference numeral 12-2, in the laminated ferrite sheet memory of the present invention.

In order to make larger "preceding" in the value of the ratio L2/L1 in accordance with an embodiment of the present invention shown in FIG. 4, each drive winding having a fixed thickness is formed alternately of wide and narrow parts. The upper and the lower drive windings 2 and 3 intersect with each other at their narrow parts.

According to another embodiment of the present invention shown in FIG. 5, each drive winding has a trapezoidal cross-section and a fixed width at the base plane thereof and is formed alternately of thick and thin parts. The upper and the lower drive windings 2 and 3 intersect with each other at their thin parts.

The present invention is so constructed that the value of the ratio L2/L1 is large enough to prevent the back voltage from being generated at the drive device and that the wave form at the rising of the read drive pulse is remarkably improved to enable the laminated ferrite sheet memory to be larger in capacity and to be operated at higher speed.

Although the present invention has been described with reference to the preferred embodiments shown in FIGS. 4 and 5, modifications may be made. For example the shapes of the drive windings shown in the FIGS. 4 and 5 can be combined for the same purpose of the present invention.

Furthermore, the laminated ferrite sheet memory according to the present invention which is composed of two layers may be composed of more than three layers.

What is claimed is:

1. In a laminated ferrite sheet memory comprising a sheet of ferrite material and upper conductive windings and lower conductive windings embedded in said material and crossing and spaced from each other, each of said windings having a different circumferential length along substantially the entire dimension of each intersection in the direction of the length of the windings, including the center of the intersection, from the dimension at places other than the intersections, said circumferential length at said intersections being shorter than at said other places.

2. A laminated ferrite sheet memory as claimed in claim 1, wherein said drive windings are made of conductive metal particles combined together.

3. A laminated ferrite sheet memory as claimed in claim 1, wherein said laminated ferrite sheet memory is composed of more than three layers.

4. A laminated ferrite sheet memory as claimed in claim 1, wherein each of said conductive windings is formed alternately of wide and narrow parts.

5. A laminated ferrite sheet memory as claimed in claim 4, wherein said drive windings have a fixed thickness.

6. A laminated ferrite sheet memory as claimed in claim 1, wherein each of said conductive windings is formed alternately of thick and thin parts.

7. A laminated ferrite sheet memory as claimed in claim 6, wherein said drive windings have a fixed width.

* * * * *